(12) United States Patent
Holmes

(10) Patent No.: US 6,880,283 B2
(45) Date of Patent: Apr. 19, 2005

(54) FISHING BOBBER HAVING A PAIR OR MORE OF ADJUSTABLE FLOATS

(76) Inventor: Jerry B. Holmes, 1145 Jackson Dr., Paris, TN (US) 38242

( * ) Notice: Subject to any disclaimer, the term of this patent is extended or adjusted under 35 U.S.C. 154(b) by 33 days.

(21) Appl. No.: 10/447,436

(22) Filed: May 29, 2003

(65) Prior Publication Data

US 2004/0237376 A1 Dec. 2, 2004

(51) Int. Cl.[7] .......................... A01K 93/00; A01K 75/04
(52) U.S. Cl. ........................... 43/4.5; 43/44.9; 43/44.91; 43/44.87
(58) Field of Search ............................... 43/44.9, 44.91, 43/4.5, 44.87

(56) References Cited

U.S. PATENT DOCUMENTS

| | | | | |
|---|---|---|---|---|
| 332,573 | A | * | 12/1885 | Tufts ........................ 43/44.91 |
| 1,317,496 | A | * | 9/1919 | Hessler ........................ 43/17 |
| 3,303,598 | A | * | 2/1967 | Spindler ..................... 43/44.9 |
| 3,323,247 | A | * | 6/1967 | Murray ........................ 43/17 |
| 3,381,407 | A | * | 5/1968 | McDougall ............... 43/44.91 |
| 3,800,461 | A | | 4/1974 | Jacobi |
| 4,418,492 | A | | 12/1983 | Rayburn |
| 4,856,219 | A | | 8/1989 | Severance et al. |
| 5,105,576 | A | | 4/1992 | Kohus |
| 5,713,152 | A | | 2/1998 | Domack |
| 5,737,868 | A | | 4/1998 | Rikard |
| 6,158,164 | A | | 12/2000 | Mack et al. |
| 6,173,524 | B1 | | 1/2001 | Kinchen, Sr. |
| 6,389,736 | B1 | | 5/2002 | Frost |
| 6,389,737 | B1 | | 5/2002 | Larumbe Salinas |

FOREIGN PATENT DOCUMENTS

FR  1120300  * 7/1956 ................ 43/44.91

* cited by examiner

Primary Examiner—Kurt Rowan
(74) Attorney, Agent, or Firm—Pitts & Brittian, P.C.

(57) ABSTRACT

An adjustable fishing bobber including floats slidably disposed on a tubular member. The bobber is connectable to a fishing line for casting into a body of water for use in a variety of water and weather conditions. Each float includes an internal channel through which the tubular member is slidably inserted, and each float is removable for rearrangement to a selected orientation of a plurality of positions on the tubular member. One position includes a larger float in a lower position with a smaller float aligned above for use in windy conditions. A reversed position includes the smaller float in the lower position and the larger float aligned above for use in water having a current. The floats are easily replaced and rearranged by sliding one or more floats off the tubular member and repositioning one or more floats on the tubular member depending on the water and weather conditions.

16 Claims, 4 Drawing Sheets

FISHING BOBBER HAVING A PAIR OR MORE OF ADJUSTABLE FLOATS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to fishing bobbers and more particularly, pertains to a fishing bobber having floats that are adjustable in orientation.

2. Description of the Related Art

Float fishermen often utilize fishing bobbers that include a float having a connector to secure the bobber to the fishing line. A typical float includes a light-weight and buoyant sphere which can be blown about or otherwise affected by the wind. When a person is fishing during changing weather conditions, the bobber may need to be replaced frequently with alternative sized floats. Frequent retrieval of the fishing line to replace the float on the fishing line is time consuming and reduces the actual fishing time. If a large float is utilized during windy conditions, the float can be quickly moved downwind from a favored fishing spot. If a small float is utilized due to windy conditions, subtle movement of the float may not be noticed upon contact of a fish with a hook connected to the float through the line. A disadvantage of prior floats relates to breakage of the float external hook connectors and loss of contact of the float with the fishing line during casting.

There is a need for a fishing bobber having adjustable floats in a selected orientation, and that can be repositioned quickly to a second orientation depending on changing weather and/or water conditions. Moreover, a need exists for a fishing bobber that is minimally affected by windy conditions or waves while being sensitive to a fish nibbling on the baited hook attached to the fishing line leading to the bobber.

BRIEF SUMMARY OF THE INVENTION

An adjustable fishing bobber is disclosed having at least two buoyant bodies or floats that are slidably disposed on a tubular member. The bobber is connected to a fishing line and cast into a body of water. The bobber design renders it suitable for use in a variety of water and weather conditions. Each float includes an internal channel through which the tubular member is slidably inserted. Moreover, each float can be removed from the tubular member for rearrangement of the respective floats in a plurality of orientations on the tubular member. The floats are preferably of different sizes such that a larger float can be placed in a lower position with a smaller float aligned above the larger float for use in windy conditions. A reversed position of the two floats is readily attained with the larger float in the upper position for improved sighting and the smaller float in the lower position to provide a bobber more visually sensitive to fish strikes. In order to allow casting of the floats disposed on the tubular member, fishing line is extended through the length of a hollow interior of the tubular member for connection of the fishing line to a weight and a hook. The floats are easily rearranged or interchanged by the user sliding one or both floats off of the tubular member to reposition each float on the tubular member depending on the water and weather conditions during fishing.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An adjustable fishing bobber 10 is disclosed for fishing in a variety of water and weather conditions, as illustrated in FIGS. 1–5. The bobber 10 includes at least two buoyant bodies, referred to herein as floats 16, 26, that are slidably disposed on a tubular member 36. The bobber 10 can be connected to a fishing line 50 for casting into a body of water for fishing and its design renders it useful in a variety of water and weather conditions. The benefit of the bobber 10 having at least two floats 16, 26 slidably positionable thereon includes the ability to quickly adjust the position and orientation of each float 16, 26 on the tubular member 36 in response to various fishing conditions including windy conditions, choppy water conditions, and/or swift moving water current conditions.

Figure 1:
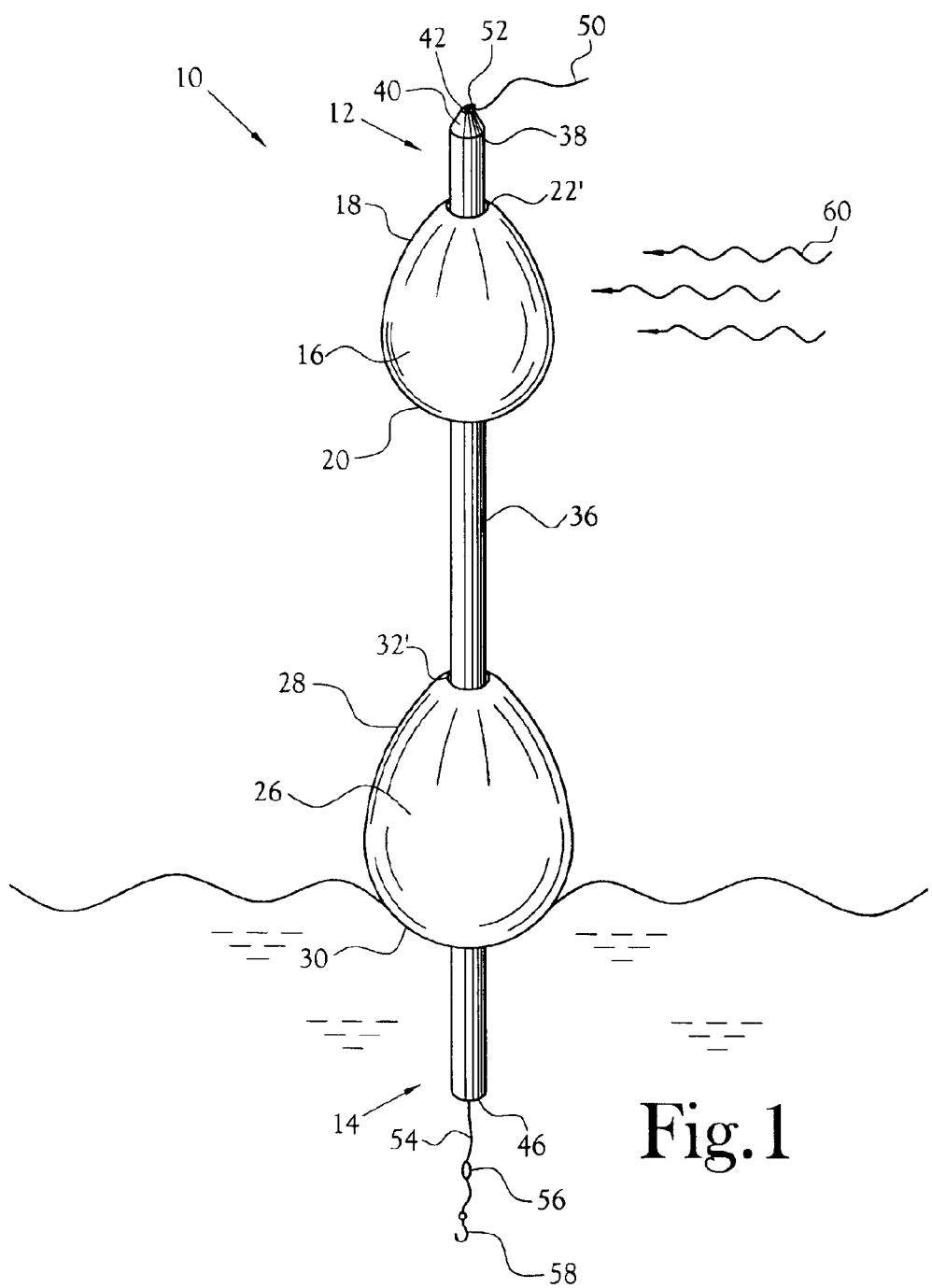
FIG. 1 is a perspective view of one embodiment of an adjustable fishing bobber of the present invention.
Figure 2:
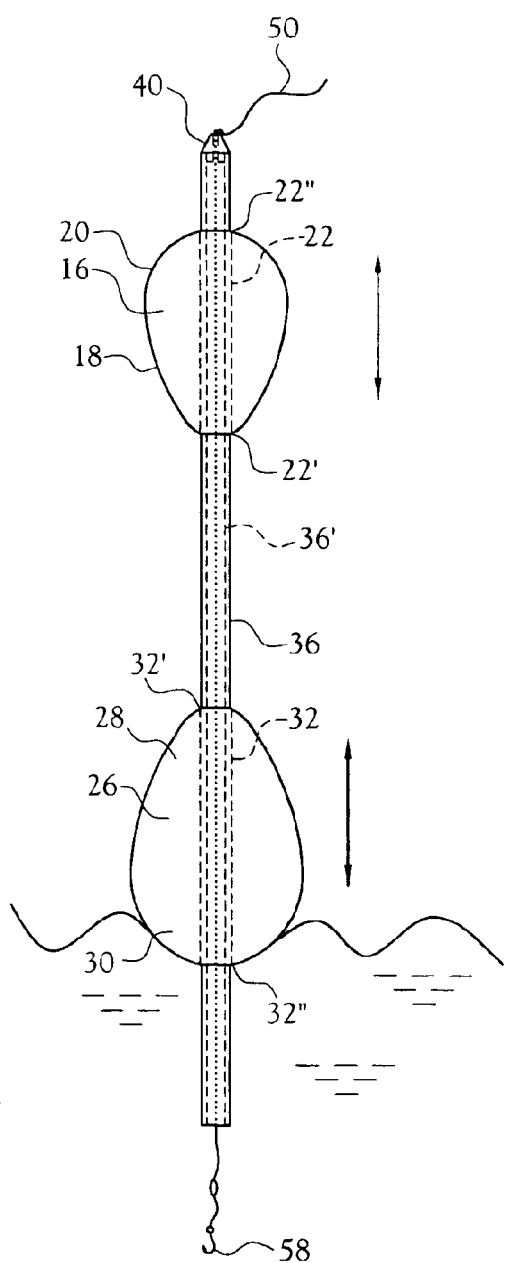
FIG. 2 is a side view of the adjustable fishing bobber of FIG. 1, illustrating a larger diameter float in a lower position during use in turbulent water.

In the embodiment illustrated in FIGS. 1 and 2, the bobber 10 includes a first float 16 that is slidably disposed on an upper portion 12 of the tubular member 36, and a second float 26 that is slidably disposed on a lower portion 14 of the tubular member 36. The first float 16 is substantially egg-shaped or ovoid and is generally smaller in size than the second float 26. The first float 16 includes a tapered end 18 having an exterior diameter less than the exterior diameter of the opposed base end 20. An internal opening or channel 22 is aligned along the lengthwise axis of the first float 16. The diameter of the internal channel 22 is approximately equal to and preferably slightly less than the external diameter of the tubular member 36 to form a force-fit therewith such that the first float 16 remains in one position on the tubular member 36 during casting of the bobber 10 after the user slides the first float 16 to a preferred position. The first float 16 is slidably disposed in any one of a plurality of positions along the length of the tubular member 36 by insertion of either end of the tubular member 36 through either a first opening 22', or a second opening 22" of the internal channel 22.

In the embodiments illustrated in FIGS. 1 and 2, the bobber 10 includes a second float 26 that is slidably disposed in a plurality of orientations on a lower portion 14 of the tubular member 36. The second float 26 includes a tapered end 28 and an opposed base end 30 having an internal channel 32 through which the tubular member 36 is inserted. The second float 26 is slidably disposed in any one of a plurality of positions along the length of the tubular member 36 by insertion of either end of the tubular member 36 through either a first opening 32', or a second opening 32" of the internal channel 32. Depending on weather and water conditions the second float 26 can be disposed in a selected first orientation on the lower portion 14 of the tubular member 36 (see FIG. 2) for rough water in order to provide a more stable base for the bobber 10. In the selected first orientation, the first float 16 is disposed above the second float 26. For calm surface water and calm wind conditions, the second float 26 can be disposed in a second orientation on the upper portion 12 of the tubular member 36 (see FIG. 3) for increased visibility to the user of the larger sized second float 26. In the second orientation, the first float 16 is disposed below the second float 26. Either the tapered end 18 or the base end 20 of first float 16 can be disposed in a lower position for contact with the water.

The tubular member 36 comprises a cylindrical tube composed of light-weight material such as plastic, and includes a hollow interior 36' through which a fishing line 50 can be extended. The upper portion 12 of the tubular member 36 has an upper opening 38 in which a conical plug 40 is removably inserted (see FIGS. 1 and 4). The conical plug 40 includes a small diameter upper restriction hole 42 and a lower restriction hole 44 (see FIG. 4) through which the fishing line 50 is inserted for extension though the hollow interior 36' and through a lower opening 46 of the lower portion 14 of the tubular member 36. Upon insertion of the fishing line 50 through the length of the tubular member 36, a slip knot 52 can be tied in the fishing line 50 to deter further sliding of the fishing line 50 through the upper hole 42 of the plug 40. A fish hook 58, and weight 56 can be attached to the distal end 54 of the fishing line 50 extended from the lower opening 46. Upon casting of the bobber 10 into the body of water, the slip knot 52 stops movement of the fishing line 50 through the plug hole 42, and the hook 58 and weight 56 are maintained a spaced apart distance from the lower opening 46 when the lower portion 14 of the tubular member 36 is immersed in water. The buoyancy of the bobber 10 is maintained in the water by either the second float 26 or the first float 16 being disposed on the lower portion 14 of the tubular member 36.

In one embodiment of the bobber 10, the first float 16 is disposed on the upper portion 12 of the tubular member 36, with the tapered end 18 oriented either up or down, and the larger second float 26 on the lower portion 14 (see FIGS. 1 and 2). The larger second float 26 is positioned in the lower position when the bobber 10 is utilized in choppy water having substantial waves as illustrated in FIG. 2 in order for the larger diameter base end 30 of the second float 26 to provide a more stable base for support of the smaller first float 16 in an elevated and visible position on the upper portion 12 of the tubular member 36.

Figure 3:
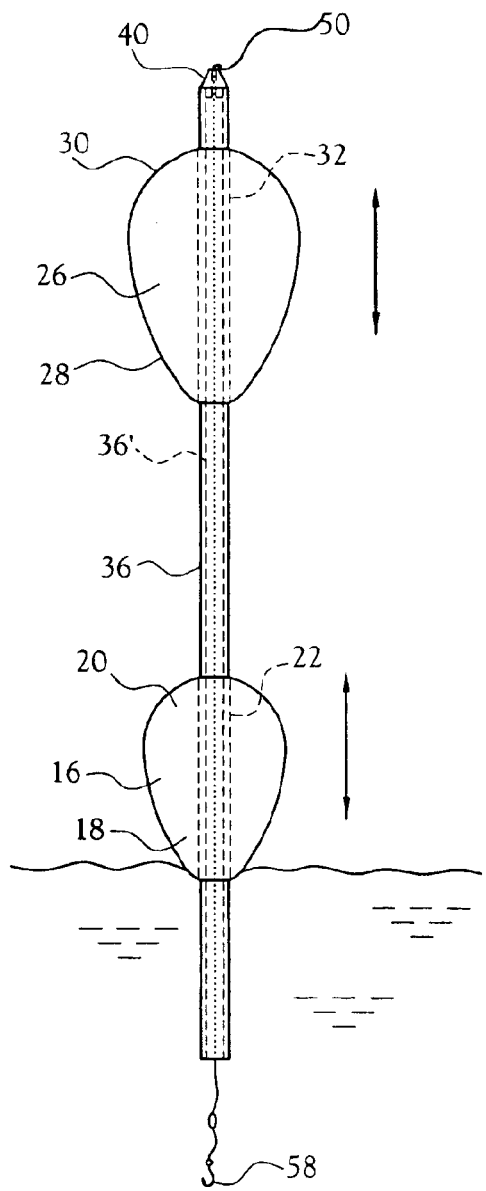
FIG. 3 is a side view of an alternative embodiment of FIG. 2, illustrating a smaller diameter float in the lower position during use in water having a swift current.
Figure 4:
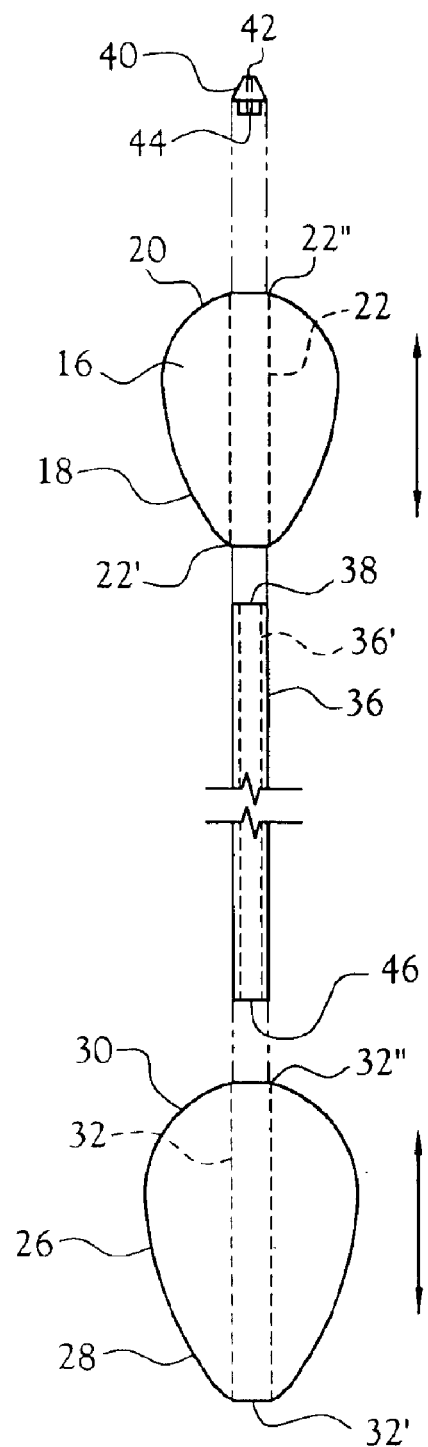
FIG. 4 is a side view of the separate elements of the fishing bobber of the present invention.

In one alternative embodiment of the bobber 10, the larger second float 26 is disposed on the upper portion 12 of the tubular member 36, with the tapered end 28 oriented either up or down depending on the user's preference (see FIG. 3). The smaller first float 16 is disposed on the lower portion 14, with the tapered end 18 oriented either up or down depending on the user's preference. The smaller first float 16 is disposed in the lower position when fishing in a body of water having a water current that would quickly move the larger base 30 of the second float 26 away from the fishing location selected by the user. Another benefit of positioning the second float 26 in the upper position is that when a fish nibbles on the hook 58, the smaller first float 16 is more sensitive to movement of the hook 58. More specifically, the smaller float 16 is easily pulled under the surface of the water when a fish strikes the hook 58. The fish will be hooked more firmly when the larger second float 26 contacts the surface of the water as the bobber 10 is pulled downwards. This feature provides staged resistance to submersion of the bobber 10.

An additional alternative embodiment includes utilizing a different shaped float (not shown) having an internal channel 32 therein, with the different shaped float interchangeable with either one of the egg-shaped floats 16, 26. Specifically, either egg-shaped float 16, 26 is positioned on the lower portion 14 of the tubular member 36, and an oblate spheroid shaped float is positioned on the upper portion 12 of the tubular member 36. A reverse orientation is readily attained by sliding the oblate spheroid float to the lower portion 14 on the tubular member 36, and either of the egg-shaped floats 16, 26 are removed and repositioned on the upper portion 12. Different shaped floats may include the oblate spheroid shape such as a football shape, a spherical shape, or an elongated cylindrical shape. Any of the shapes selected by the user may be of any readily visible color, or a combination of colors such as a bright orange, red, green and/or yellow, or another highly visible color.

Figure 5:
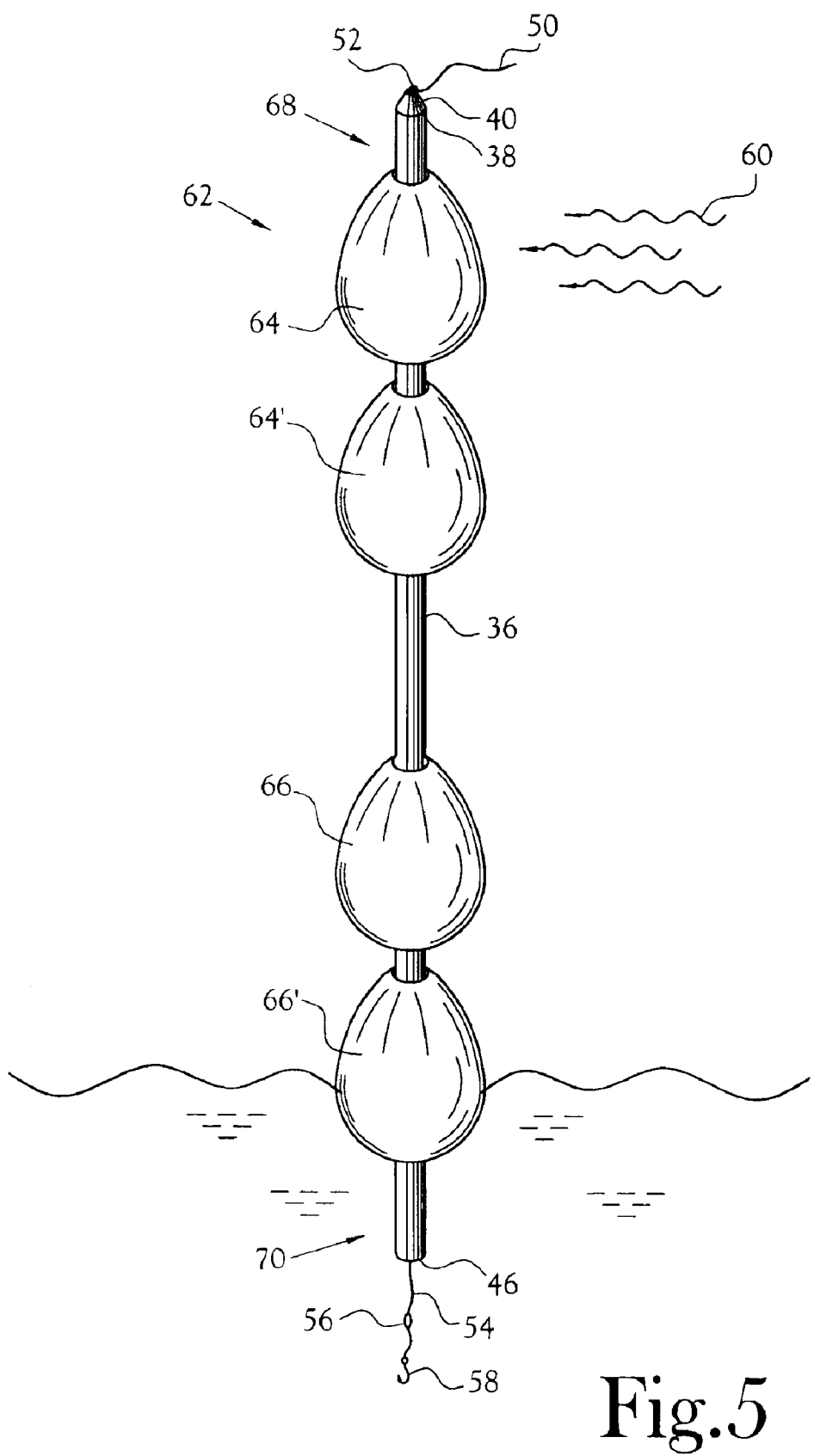
FIG. 5 is a perspective view of an alternative embodiment of an adjustable fishing bobber of the present invention.

An additional alternative embodiment is illustrated in FIG. 5 for use during fishing for small sizes of fish such as brim. The adjustable fishing bobber 62 includes a grouping of three small floats, or a plurality of small floats 64, 64', 66, 66' that are slidably disposed on the tubular member 36. The small floats 64, 64', 66, 66' are positioned in a spaced apart orientation having a distance separating each float dependent on the fishing conditions. The small floats 64, 64', 66, 66' are slidably disposed for detachment and re-attachment on the tubular member 36 in a multitude of positions in relation to each other, to provide a fishing bobber 62 that is very responsive to nibbles and strikes by a small fish on the hook 58. The small floats 64, 64', 66, 66' are easily moved and adjusted with a smaller end oriented toward the water, or are oriented with a larger end oriented toward the water. The plurality of small floats are adjustable with one pair of floats 64, 64' disposed on an upper portion 68 of tubular member 36, and with a second pair of floats 66, 66' disposed on a lower portion 70 of tubular member 36. The variety of positions for the small floats provide a fishing bobber 62 having floats that are quickly adjustable for accommodating changing weather and water conditions, and for fishing for different sizes of fish.

While the present invention is illustrated by description of several embodiments and while the illustrative embodiments are described in considerable detail, it is not the intention of the applicant to restrict or in any way limit the scope of the appended claims to such 6detail. Additional advantages and modifications will readily appear to those skilled in the art. The invention in its broader aspects is therefore not limited to the specific details, representative apparatus and methods of use, and illustrative examples shown and described. Accordingly, departures may be made from such details without departing from the spirit or scope of the general inventive concept disclosed herein.

Having thus described the aforementioned invention, I claim:

1. A fishing bobber connectable to a fishing line for casting into a body of water in a variety of water and weather conditions, comprising:

at least two floats, each float having an internal channel extended through and aligned with a length a is of each float;

a tubular member slidably insertable through said internal channel in each float, said tubular member having an exterior tube diameter comparable to said internal channel in each float for retention of said floats in a lower position and an upper position of a plurality of float positions on said tubular member, said tubular member having a hollow interior extended to open at opposed first and second ends through which a fishing line is extendable;

a tapered plug is removably insertable into said first end of said tubular member, said tapered plug having an opening therethrough in which the fishing line is threaded for passage through said tubular member and extension from said second end for connection to a hook;

said at least two floats including:

a first float having a base end of a larger diameter than a tapered end, said first float is slidably positioned on said tubular member with said base end disposed in a firs selected on orientation in either of raid lower or upper positions on said tubular member; and a second float having a base end and a tapered end, said second float is slidably positioned on said tubular member a spaced apart distance from said first float with either float slidably positioned in said lower position on said tubular member;

whereby said spaced apart distance is adjustable in separation between said first float and said second float in a windy weather condition, said spaced apart distance facilitates said fishing bobber maintained in a substantially upright orientation relative to the water surface for a fish strike on the hook resulting in staged resistance to submersion by respective base ends of said first and second float and further setting the hook in the fish.

2. The fishing bobber of claim 1 including:

said first float is slidably positioned on said tubular member with said tapered end disposed proximal to said first end of said tubular member; and said second float of a smaller size than said first float, said second float is slidably positioned on said tubular member said spaced apart distance below said first float;

whereby said spaced apart distance is adjustable in separation between said first float and said second float for fishing in a body of water having a significant current.

3. The fishing bobber of claim 1 including:

said first float is slidably positioned on said tubular member with said tapered end disposed proximal to said first end of said tubular member; and said second float of a smaller size than said first float, said second float is slidably positioned on said tubular member with said tapered end proximal to said base end of said firs float in said spaced apart distance above said first float;

whereby said spaced apart distance is adjustable in between said first float and said second float in a windy weather condition.

4. The fishing bobber of claim 1 including:

said first float is slidably positioned on said tubular member with said tapered end disposed proximal to said first end of said tubular member; and said second float of a lesser size than said first float, said base end of said second float is slidably positioned proximal to said second end on said tubular member, said second float is disposed said spaced apart distance below said first float;

whereby each of said first and second floats are slidably removable from respective opposed ends of said tubular member, with said first and second floats being switched in position an rotatably turned before being slidably reinserted on said tubular member, said spaced apart distance is adjustable in separation between aid first float and said second float for fishing in a body of water having a significant current.

5. A fishing bobber connectable on a fishing line for indicating the location of the fishing line on the surface of a body of water in a variety of water and weather conditions, comprising:

a first and a second float, each float having an internal channel therethrough; and a tubular member slidably insertable through said internal channel of each float, said first and second floats are removably interchangeable in a plurality of spaced apart orientations on said tubular member, said tubular member having a longitudinal oriented hollow interior extending to open at opposed ends through which a fishing line is extendable for connection to a hook external of said tubular member;

whereby each first and second float is separately slidably positioned in said plurality of spaced apart orientations on said tubular member to maintain said tubular member in a substantially upright orientation on the surface of the body of water with the fishing line extended through said tubular member during fishing in a variety of water and weather conditions;

whereby said first and second floats are slidably removable from respective opposed ends of said tubular member, with said first and second floats being switched in position on aid tubular member and slidably reinserted thereon, upon assessment of the water and weather conditions.

6. The fishing bobber of claim 5 wherein said tubular member including a first end having a restriction plug removably inserted therein and including an opposed second end for immersion in water during use, said restriction plug having an end opening of sufficiently narrow diameter to minimize slippage therethrough of a knotted portion of the fishing line, whereby the fishing line is extended from the opposed second end for connection to a weight attached proximal to the hook, said second end being placed into the water upon casting of the fishing bobber into the body of water.

7. The fishing bobber of claim 6 including:

said first float having an ovoid base and a tapered end, said first float is slidably positioned on said tubular member n a selected first orientation with said ovoid base disposed proximal to said base of said tubular member; and said second float having a lesser size than said first float, said second float having an ovoid base and a tapered end, said tapered end of said second float is slidably positioned proximal said first end of said tubular member, said ovoid base of said second float disposed a spaced apart distance above said first float;

whereby said spaced apart distance is adjustable in separation between said first float and said second float in windy weather conditions.

8. The fishing bobber of claim 7 including:

a selected second orientation having said first float and said second float reversed in orientation relative to each other on said tubular member, said second orientation having said second float below said first float for use in a body of water having a significant water current, whereby said spaced apart distance is adjustable in separation between said first float and said second float.

9. The fishing bobber of claim 7 including:
a selected third orientation having said ovoid base of said second float proximal to said first end of said tubular member, said second float tapered end directed toward said first float;
whereby said spaced apart distance is adjustable to minimum separation between said first float and said second float on said tubular member for use in windy weather conditions.

10. A fishing bobber system for connection on a fishing line during use in a variety of water and weather conditions, comprising:
at least two floats, each float including a tapered shape having a lesser diameter end and having an internal channel extended therethrough; and
a tubular member slidably insertable though said internal channel in each of said at least two floats, said tubular ember having opposed ends separated by a sufficient length to accommodate said at least two floats in a plurality of spaced apart orientations thereon including said floats positioned in lower and upper positions, said tubular member having a longitudinally oriented hollow interior extending to open at opposed ends through which a fishing line is extendable;
said at least two floats are slidably removable from respective opposed ends of said tubular member, with said at least two floats having respective lesser diameter ends being rotatably switched in orientation and positions on said tubular member and slidably reinserted thereon, upon assessment of the water and weather conditions;
whereby each of said at least two floats are slidably reinserted and positioned in said plurality of spaced apart orientations on said tubular member having the fishing line extended therethrough for fishing in a variety of water and weather conditions, said floats in said lower and upper positions providing staged resistance to submersion of the bobber under the water when a fish strikes the fishing line.

11. The fishing bobber of claim 10 wherein said tubular member including an upper end having a restriction plug removably inserted therein and including an opposed base end for immersion in water during use, said restriction plug having an end opening of sufficiently narrow diameter to minimize slippage therethrough of a knotted portion of the fishing line,
whereby the fishing line is extended from said opposed base end for connection to a weight attached to the fishing line proximal of a hook attached on the fishing line;
whereby when a fish strikes the hook, said float in said lower position is pulled under water creating initial resistance on the fishing line and an increased resistance on the fishing line is immediately created upon the submersion of said float in said upper position thereby further setting the hook in the fish.

12. The fishing bobber system of claim 11 wherein each of said at least two floats including an ovoid shape having a base end and an opposed tapered end, each float is interchangeable in position by slidably positioning each float in said tubular member in said plurality of spaced apart orientations with each tapered end of each float oriented toward said upper end of said tubular member.

13. The fishing bobber system of claim 11 including a first float and a second float, said first float being larger in size than said second float, said first float is slidably positioned in a selected first orientation proximal to said base end of said tubular member, said second float is slidably positioned above said first float on said tubular member.

14. The fishing bobber system of claim 11 including a first float and a second float, said first float being larger in size than said second float, said first float is slidably positioned in a selected second orientation proximal to said upper end of said tubular member, said second float is slidably positioned below said first float on said tubular member.

15. A method for use of a fishing bobber system in a variety of water and weather conditions, comprising the steps of:
providing a fishing bobber having at least two float being disposed in a sliding configuration on a tubular member having a hollow interior through which a fishing line is extendable for exiting from an upper end and a base end of said tubular member;
positioning said at least two floats a selected distance apart, said step of positioning including positioning a first float proximal to said base end of said tubular member and positioning a second float proximal to said upper end of said tubular member;
a step of reversing the sliding configuration of said at least two floats upon assessment of the water and weather conditions, said step of reversing positioning said second float proximal to said base end of said tubular member and positioning said first float proximal to said upper end of said tubular member;
extending said fishing line an adequate distance from said base end of said tubular member;
connecting a hook to said fishing line extending from said tubular member; and
casting into a body of water said at least two floats disposed on said tubular member, said step of casting places said base end of said tubular member having the fishing line and the hook under the surface of the body of water with said second float disposed on th surface of the body of water,
whereby said first float is readily visible to the user of the fishing bobber system;
whereby when a fish strikes the hook, said second float is pulled under the surface of the body of water and said first float contacts the surface of the body of water, thereby setting the hook within the fish.

16. The method of claim 15 wherein said step of reversing further includes a step of slidably removing said at least two floats from respective upper end and base end of said tubular member, said step of slidably removing including a step of rotatably turning either one of said floats and slidably reinserting said second float proximal to either end of said tubular member and positioning said first float proximal to the opposed end of said tubular member,
whereby upon completion of said step of reversing or said steps of slidably removing and slidably reinserting, when a fish strikes the hook, said float proximal of said base end is pulled under water creating initial resistance on the fishing line and an increasingly staged resistance to further submersion of the fishing line is immediately created upon contact of said float proximal of said upper end of said tubular member thereby further setting the hook in the fish.

* * * * *